(12) United States Patent
Borchers

(10) Patent No.: US 8,539,264 B2
(45) Date of Patent: Sep. 17, 2013

(54) CONNECTION UNIT FOR PATCH CABLES OF POWER-OVER-ETHERNET NETWORKS WITH AN EMBEDDED SWITCH CONTROLLED BY A CENTRAL CONTROL SYSTEM

(75) Inventor: Axel Borchers, Magdeburg (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 236 days.

(21) Appl. No.: 13/003,164

(22) PCT Filed: Jul. 29, 2009

(86) PCT No.: PCT/EP2009/005504
§ 371 (c)(1),
(2), (4) Date: Jan. 18, 2011

(87) PCT Pub. No.: WO2010/012461
PCT Pub. Date: Feb. 4, 2010

(65) Prior Publication Data
US 2011/0145613 A1 Jun. 16, 2011

(30) Foreign Application Priority Data
Jul. 30, 2008 (DE) .......................... 10 2008 035 544

(51) Int. Cl.
*G06F 1/00* (2006.01)
(52) U.S. Cl.
USPC ........................................................ 713/300
(58) Field of Classification Search
USPC .................. 713/300; 370/245, 395; 455/572
See application file for complete search history.

(56) References Cited

U.S. PATENT DOCUMENTS 8,295,185 B2 * 10/2012 Binder .......................... 370/245
2004/0164619 A1 * 8/2004 Parker et al. .................... 307/80

(Continued)

FOREIGN PATENT DOCUMENTS

DE 10209339 9/2003
WO 2006/055948 A1 5/2006

OTHER PUBLICATIONS

International Search Report for PCT/EP2009/005504 dated Sep. 24, 2009 (Forms PCT/ISA/220 and PCT/ISA/210) (German Translation).
International Search Report for PCT/EP2009/005504 dated Sep. 24, 2009 (Form PCT/ISA/210) (English Translation).
Written Opinion of the International Searching Authority for PCT/EP2009/005504 (Form PCT/ISA/237).

(Continued)

Primary Examiner — Thomas Lee
Assistant Examiner — Robert Cassity
(74) Attorney, Agent, or Firm — Buchanan Ingersoll & Rooney PC

(57) ABSTRACT

The connection unit is intended for connecting terminals (T) to networks (LAN) that provide electric energy (E) to the terminals (T) connected thereto. The connection unit (AE) is configured for generating electric energy for the connection unit (AE) from the energy (E) provided, and has a switching element (SE) for separating the supply of energy for the terminals (T), wherein the switching element (SE) is controlled via the network (LAN). It is advantageous that the energy supply of the terminals (T) can be separated or switched on via the network (LAN) by means of the switching elements (SE), for example as a function of the presence or the location of users of terminals (T). Since the separations of the energy supply to the terminals may be carried out over longer periods of time, such as during the night, the energy consumption of the terminals (T) or of the networks (LAN) providing the electric energy to the terminals (T) can be reduced significantly.

15 Claims, 2 Drawing Sheets

(56) References Cited

U.S. PATENT DOCUMENTS

| | | | |
|---|---|---|---|
| 2004/0230846 A1* | 11/2004 | Mancey et al. | 713/300 |
| 2005/0080516 A1 | 4/2005 | Pincu et al. | |
| 2005/0136989 A1* | 6/2005 | Dove | 455/572 |
| 2006/0165097 A1* | 7/2006 | Caveney | 370/395.53 |
| 2006/0290208 A1 | 12/2006 | Chang et al. | |
| 2007/0132487 A1 | 6/2007 | Kestelli | |
| 2007/0257780 A1* | 11/2007 | Schindler | 340/310.11 |
| 2008/0064395 A1* | 3/2008 | Sibileau | 455/433 |
| 2008/0080415 A1* | 4/2008 | Stephenson et al. | 370/328 |

OTHER PUBLICATIONS

International Preliminary Report on Patentability for PCT/EP2009/005504 dated Sep. 24, 2009 (Form PCT/IB/373, PCT/ISA/237) (German Translation).

International Preliminary Report on Patentability for PCT/EP2009/005504 dated Sep. 24, 2009 (Form PCT/IB/373, PCT/ISA/237) (English Translation).

Written Opinion of the International Searching Authority for PCT/EP2009/005504 dated Sep. 24, 2009 (Form PCT/ISA/237) (English Translation).

* cited by examiner

000
CONNECTION UNIT FOR PATCH CABLES OF POWER-OVER-ETHERNET NETWORKS WITH AN EMBEDDED SWITCH CONTROLLED BY A CENTRAL CONTROL SYSTEM

CROSS-REFERENCE TO RELATED APPLICATIONS

This application is the United States national phase under 35 U.S.C. §371 of PCT International Patent Application No. PCT/EP2009/005504, filed on Jul. 29, 2009, and claiming priority to German Application No. 10 2008 035 544.5, filed on Jul. 30, 2008. Those applications are incorporated by reference herein.

BACKGROUND OF THE INVENTION

1. Field of the Invention

Embodiments of the invention are related to reduction of energy consumption by terminals connected to networks, where the networks provide energy to the terminals.

2. Background of the Related Art

In local networks, especially in Power-over-Ethernet (PoE) networks, a structured cable system—also called patch cable in the industry—serves to transmit data and especially data packets to and from the connected terminals. In addition, local networks provide power for the operation of the terminals. A network according to Power-over-Ethernet for instance is defined in standard IEEE-802.3af and a cable system to go along with it is defined in ISO standard 11801 or EN 50173. A patch cable or connection cable for a local network connects an access point of the local network, especially a Power-over-Ethernet network, with a connection unit within the terminal in order to achieve the physical adaptation of the network to the terminal and for the bidirectional transmission of the data and provided energy.

The provided energy—in the case of Power-over-Ethernet a low voltage source—feeds detached terminals such as VoIP-phones (Voice over internet protocol), WLAN access points (Wireless Local Area Networks), webcams or security devices, which means the terminals can be operated on the network without additional energy or power supply. The introduction of such networks presumes that these terminals are operated continuously and need a constant energy supply from the network.

BRIEF SUMMARY OF THE INVENTION

The important aspect of the invention is that the connection unit is designed to generate electrical energy for the connection unit from the provided energy and that it comprises a switch element to interrupt the supply of electrical energy to the terminals, with the switch element being controlled via the network.

One important advantage of the invention is that it is possible for instance to use the switch elements and the network to interrupt the energy supply to the terminals, depending on the presence or the location of the users of the terminals. Since the interruptions of the energy supply to the terminals can be controlled for longer periods of time, e.g., during the night or during a longer absence from the terminal, the energy consumption of the terminals or the networks providing the energy to the terminals can be significantly reduced.

Embodiments of the invention foresee a network in form of a Power-over-Ethernet network, specifically according to IEEE-Standard 802.3af. Advantageous is that the connection unit including the switch element has been configured in one of the two connectors of a patch cable or in the patch cable itself. By integrating the connection unit—also called network card in the industry—including the switch element, an especially economical realization of the invention becomes possible. With integration according to the invention, the use of the terminals remains practically uninterrupted.

In order to control the switch element via the assigned management system, the connection unit or the switch element will preferably have a network address assigned. Since networks are increasingly using the internet protocol, the network address will preferably be an internet address. The network address is inserted into a command created by the management system that is transmitted to the connection unit via the network and that contains information for the control of the switch element.

The switch element can be advantageously controlled depending on time and/or the presence of a user at or in the area of the assigned terminals and/or dependent on location or security. The time-dependent control for instance can be a daytime and/or a week control function in the management system. For the presence-dependent or location-dependent control function, an access system or RFID-system or GPS-system or wireless locating system is provided, wherein the presence and the location of a user will be signaled to the management system for control purposes.

In case of an interrupted energy supply to the terminals, the connection unit will be advantageously controlled in a mode with reduced energy consumption. This can reduce the energy consumption even further.

Other advantageous further embodiments of the invention or a design of a connection unit according to the invention and of a patch cable, a management system and a communication setup are provided.

BRIEF DESCRIPTION OF THE FIGURES

The following text further explains the invention and its embodiments, with reference to two drawings. They consist of.

DETAILED DESCRIPTION OF THE INVENTION

Figure 1:
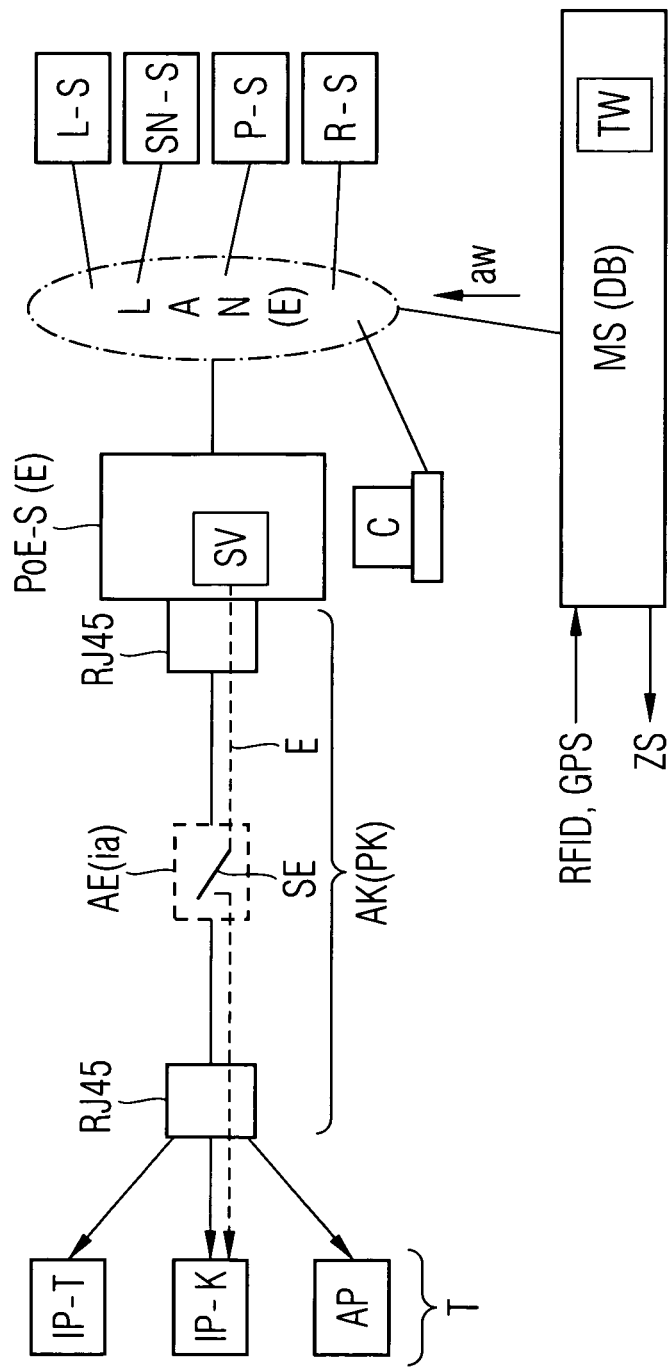
FIG. 1 a network diagram, in which the connection unit has been realized according to the invention and FIG. 2 in a block diagram a realization of a connection unit

FIG. 1 shows an example of a Power-over-Ethernet switch PoE-S with a connected connection cable AK. The connection cable AK is known in the industry as a patch cable PK and shall be called patch cable PK in the following—in FIG. 1 it is labeled as AK (PK). The patch cable PH may be connected to different terminals T. The connectable terminals T can comprise IP-phones IP-T, IP-cameras IP-K or access points AP for wirelessly connectable terminals for wireless local networks, e.g. Wireless LAN. The connections are indicated with arrows in FIG. 1.

A Power-over-Ethernet switch (PoE-S) represents a switching unit in an Ethernet E or local network LAN, which is used to connect Ethernet segments and to signal and transmit communication relationships between the terminals connected to the Ethernet E or the terminals T connected to the Ethernet segments or to terminals T of other networks—indicated in the Fig. with the label PoE-S(E). The switching occurs mostly in level 2, the security level, based on close-to-hardware MAC-addresses (Media Access Control). Modern Power-over-Ethernet Switches PoE-S offer level 3 functions to monitor and control local networks and management functions in local networks.

A Power-over-Ethernet Switch PoE-S is also equipped with a power supply SV, which provides electrical energy E to the connected terminals T. The energy or power supply from the Power-over-Ethernet Switch PoE-S to the terminal T is handled via the patch cable PK—indicated with a dashed arrow labeled E in FIG. 1. The energy or power supply of the terminals T which are connected to the Power-over-Ethernet Switch PoE-S has been advantageously realized acc. to IEEE Standard 802.3af. Patch cable PK has a standard connector RJ-42 on both sides, wherein the energy is supplied via provided connection elements or plug points of the connector RJ-45. The data or information to be transmitted to or received from terminal T by the Power-over-Ethernet Switch PoE-S are transmitted via other connection elements of the RJ-45 connector. Patch cable PK for the transmission of data or data packets and for the energy supply via the patch cable PK is advantageously designed as a structured cabling system acc. to ISO standard 11801 or EN 50173.

According to ITU standard 803.2af the equipment involved is divided into energy providers (Power Sourcing Equipment, PSE) and energy consumers (Powered Devices, PD). The supply voltage is 48 V, the maximum current in continuous operation is 350 mA. Usually, the free connections or lines of the Ethernet cable or patch cable PK are used to transfer energy. If this is not possible, signal routing connections or lines of the patch cable PK may be used. The energy transmission via signal lines does not interfere when Ethernet of 10BaseT (10 Mbit/s) and 100BaseTX (100 Mbit/s) are used. With 1000BaseT all 8 connections or lines are used, i.e., in this case, the energy is transmitted together with the signal.

The Power-over-Ethernet Switch PoE-S is connected to a local network LAN, which is shown in the embodiment as Ethernet E—and indicated in the Fig. with the label LAN (E). In the Ethernet E the internet protocol or in the case of voice transmission a VoIP protocol (Voice over Internet Protocol) is the preferred superordinated signaling protocol.

To realize a standardized Lightweight Directory Access Protocol (LDAP), a LDAP server L-S is connected to the Power-over-Ethernet Switch PoE-S. The protocol LDAP standardized in RFC 4511 in the current version is based on a client/server structure, i.e., a client C—usually realized by a PC—is connected to the local network LAN for communication with the LDAP server L-S. The LDAP Server L-S contains an implementation of a directory that can be administered and queried by the client C. Thus, management functions in the local network LAN and the terminals T in particular can be monitored and controlled.

An authentication server P-S is connected to the local network LAN to authenticate the terminals T and Server S connected to the LAN. With the authentication server P-S, users like terminal T or other components of the local network LAN are certified with certificates, for which the authentication server P-S provides public keys.

In the embodiment a RADIUS Server R-S (Remote Authentication Dial-In User Service) has been connected to the local network LAN. A RADIUS-Server R-S is a central authentication server, which identifies all Remote Access Services (RAS), i.e., any terminals dialing into the local network LAN. The RADIUS Server R-S handles the authentication for the RAS Service, i.e., the examination of username and password. In addition, the parameters for the actual connection are provided.

In addition, there is an SNMP Server SN-S connected to the local network LAN, serving as a realization of a Simple Network Management Protocol SNMP. The SNMP protocol, standardized according to IETF, is meant to monitor and control network components like switches, servers, computers etc. from a central point or from the SNMP Server SN-S. The protocol describes the structure of the data packets and the communication procedure in detail for the monitoring of the network components, the remote operation and remote configuration of the network components as well as the error detection and error messaging.

An important aspect of the invention is that the patch cable PK has an integrated connection unit AE for connecting to a Power-over-Ethernet Switch PoE-S, providing a switch element SE for the interruption of the energy supply SV to the terminal T—indicated in FIG. 1 with a dashed rectangle labeled AE. The switch element SE is managed or controlled by a central management system MS in the local network LAN via the connection unit AE and the Power-over-Ethernet Switch PoE-S. The management system MS which is largely realized with Software can for instance be placed in the LDAP server L-S together with the client C or independently together with a database DB for the management and control of the switch element SE in the connection unit AE in the local network. The embodiment assumes that the management system MS has been realized independently with a management system server MS.

For the control or management of the switch elements SE in the connection units AE, each patch cable PK or each connection unit AE has been assigned an internet address. With the internet addresses ai, each switch element SE can be targeted and the energy supply EV can be switched specifically to any terminal T or it can be interrupted.

The control and management of the switch elements SE may be handled based on different criteria. One possibility is to control the switch elements SE dependent on time of day or time in general. For example, during night times or weekends the switch elements SE could be controlled by the management system MS in the assigned local network LAN in such a fashion that the electrical energy E supply to the connected terminals T is interrupted. This can reduce the energy consumption significantly. The time-based control, for instance, is integrated in the management system MS for the respective terminals T in form of a daytime/week control function TW or it can be provided via external time controls ZS—indicated with an arrow labeled ZS in FIG. 1.

Another possibility is to control the switch elements SE depending on the presence of the users at the terminals T or depending on their location. For instance, existing or future locating technologies like RFID or GPS systems or even access systems for secured areas or companies can detect if the user of a terminal T, e.g. a phone, is located near or in the area of the terminal T and if so, the invention foresees that the energy supply SV to the terminal T is switched on while in the case of user absence the energy supply SV to the terminal is interrupted. In this case, the energy consumption can be reduced even further, because the assigned terminal T will be supplied with energy only in case of user presence. This embodiment of the invention is useful for terminals T used in commercial or residential environments.

Locating systems like RFID (Radio Frequency Identification) or GPS systems (Global Positioning System) have to be placed near the terminals T by the user and must communicate with the management system via wired or wireless local networks LAN—indicated with an arrow labeled RFID, GPS in FIG. 1.

For the transmission of control data over different local networks LAN and their network components, there must be special security mechanisms which could be realized in form of a public key infrastructure (PKI), for example. A PKI structure is based on encryption with two keys, the public key and the private key. The encryption of the message is handled with the public key in combination with a mathematical algorithm and the decryption is handled by a secret private key, known only to the receiver.

Figure 2:
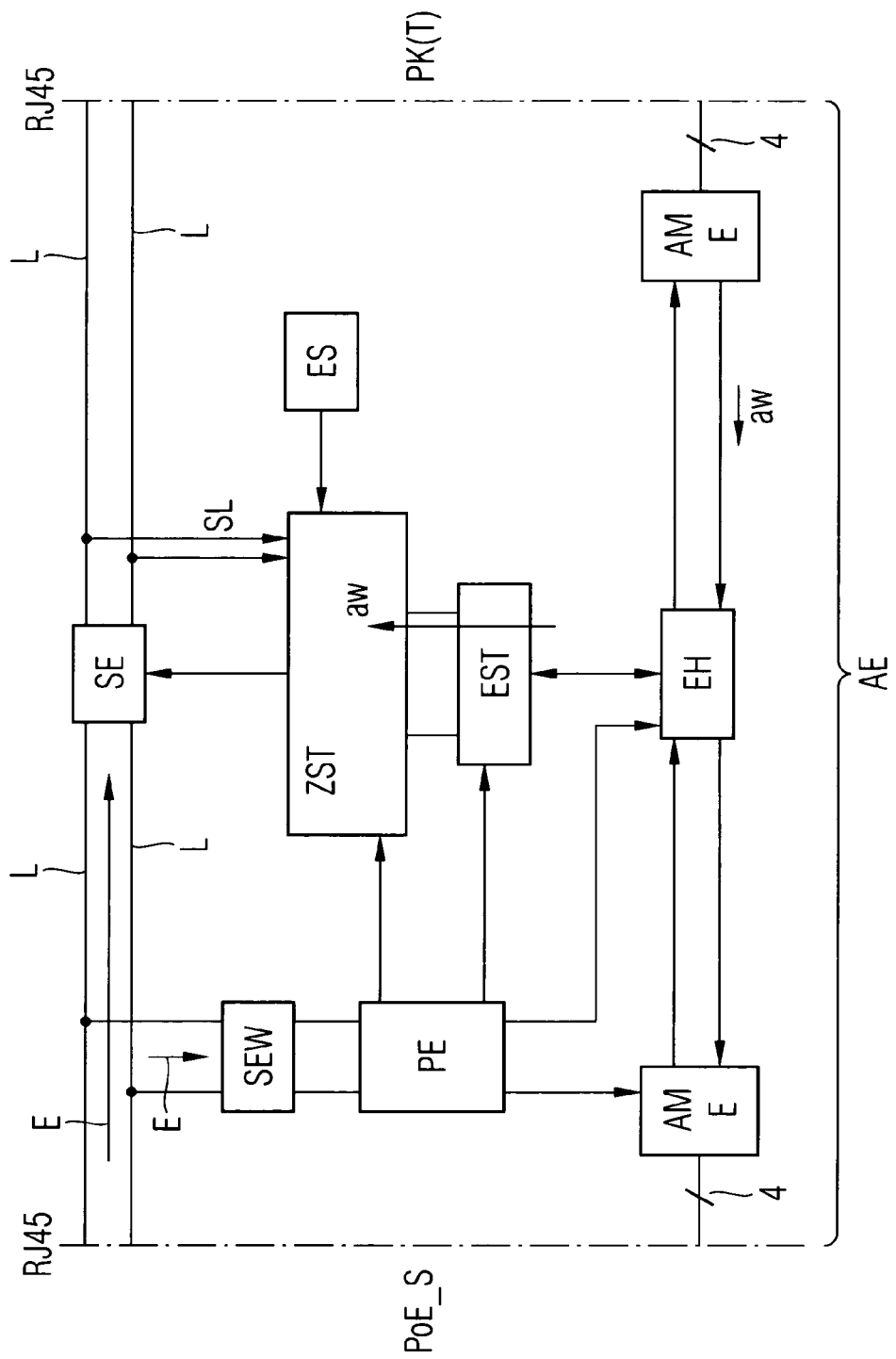

FIG. 2 shows the structure of a connection unit AE in a block diagram. In addition to the invention-specific functions, the connection unit AE contains functions like those of what is called a network card in the industry, i.e., the physical connection technology and the procedural characteristics for the connection to the Power-over-Ethernet Switch PoE-S or to the local network LAN or to the Ethernet E.

For the embodiment it is assumed that the connection unit AE is realized at or in a connector RJ45 of the patch cable PK, with which the patch cable KB [sic] is connected to the Power-over-Ethernet Switch PoE-S. An alternative design in or at the connector RJ45 to the terminal T of the patch cable PK or in form of an independent unit is also possible, as long as it is integrated in the lines of the patch cables PK—as shown in FIG. 1.

The connection unit AE has a central control system ZST which is connected to an Ethernet-control system EST. In this case, the Ethernet control system assumes the control of the Ethernet protocol according to the protocol, whereby the Ethernet E, for instance, is equipped according to IEEE Standard 802.3 with a CSMA-CD access procedure (Carrier Sense Multiple Access wir Collision Detection). The central control system—e.g., a micro-controller with low energy consumption—assumes all other control functions, especially in regard to monitoring and error detection as well as administration of the connection unit AE.

The Ethernet control system EST is connected to an Ethernet hub EH, which has two Ethernet connection modules AME connected to it. The purpose of the Ethernet hub EH is to couple the connection module AME directed to the patch cable PK or terminal T with the connection module AME directed to the Power-over-Ethernet Switch, wherein the Ethernet hub EH is controlled by the Ethernet control system EST. The connection modules AME serve to adapt the internal interface physically to the Ethernet E.

For the connection to the Power-over-Ethernet Switch PoE-S and to a line of the patch cable PK or any conventional patch cable, a respectively standardized connector RJ45 is provided, for which the Ethernet interface provided by the connection modules AME is lead to the provided plug-points 1, 2, 3, and 6 of the standardized connector RJ45.

In the embodiment plug points 4, 5, 7, and 8 of both connectors RJ45, whose purpose is the transmission of electrical energy E, are each connected to a switch element SE, with which the transmission of energy E to patch cable PK or terminal T can be switched, i.e., interrupted or turned on. The switch element SE is connected with the central control system ZST with which the switch element SE is controlled or managed, wherein the central control system ZST receives, via the Ethernet E or the local network LAN, relevant message-oriented commands aw by transmission of the management system MS regarding the control of the switch element SE—in FIGS. 1 and 2 the commands aw are indicated by arrows labeled aw.

In addition, another switch element SEW is connected with lines L, routed between the connector RJ-45 directed towards the Power-over-Ethernet Switch PoE-S and the switch element SE. The additional switch element SEW is also connected to an energy control PD with which the connection unit AE can be supplied with energy E, depending on the switch position.

With the energy unit PE a part of the energy E or voltage transmitted by lines L is adapted to the voltages needed at the connection unit AE.

When the operation of the connection unit AE is started, the switch element SE is in the "open" position, i.e., no energy E can be transmitted. The other switch element SEW, however, is in the "closed" position, i.e., energy E can be transmitted. A standardized detection process from the Power-over-Ethernet PoE-S checks if a terminal T is suited for Power-over-Ethernet, i.e., if it is designed to be supplied with energy E from the Power-over-Ethernet Switch PoE-S. In this case the energy control system PD represents the terminal to be supplied with energy E; it is appropriately designed, so that in this detection process, it acts like a terminal to be supplied with energy E. Consequently, energy E will be transmitted by the Power-over-Ethernet Switch PoE-S to the connection unit AE or via the other switch element SEW to the energy control system PD with which the components of the connection unit AE are supplied with energy or voltage.

Sensor lines SL are switched to the central control system ZST from the lines L routed between the connector RJ-45 directed to the patch cable PK or terminal T and switch element SE. With analog/digital transformers and corresponding programs implemented in the central control system ZST, sensor lines SL are used to determine if the patch cable PK of a terminal T is connected, wherein the resistance measurement between the lines L detects if a terminal T is connected via the patch cable PK. If a terminal T is connected, the lines L from one connector RJ-45 to the connector RJ-45 situated on the opposite side will be connected through the switch element SE, so that the energy E transmitted from the Power-over-Ethernet Switch PoE-S can be routed to the terminal via the patch cable PK.

Once line L is connected, the other switch element SEW cuts the connection between the lines L and the energy control system PD, wherein the supply of the connection unit AE with energy E is taken over by an energy storage function ES in this situation. The energy storage ES is realized for instance with a storage capacitor with large capacity or other storage options for electrical energy. If the energy supply for the energy control system PD is interrupted, the standardized detection procedure is handled via the patch cable PK with the terminal T, wherein the central control system ZST is monitoring the level status on lines L via the sensor lines SL. Once the central control system ZST detects the end of the detection procedure, the other switch element SEW is set to "closed", routing the energy E to the energy control system PD and supplying the connection unit AE with energy.

After transmission of a command aw from the management system MS to the central control system ZST with the stipulation to interrupt the energy supply to terminal T, the switch element SE is set to "open" and thus the energy supply is interrupted. In this condition, the connection unit AE receives energy E via the energy control system PD, wherein the connection unit is using little energy. To reduce the energy consumption even more, the connection unit AE will be put into an energy saving mode. This can reduce the energy consumption even further.

With this invention it is possible to interrupt the supply of electrical energy for terminals T, which are connected to a network providing the energy supply SV for the terminals T, in order to reduce energy consumption. The interruption is controlled by a management system MS in the network LAN time-dependent—e.g., night time and weekends—or presence-dependent and location-dependent—e.g., as detected by locating systems like access systems, RFID systems or GPS systems.

Alternatively, the connection unit AE can be supplied with energy from the energy storage ES in an energy saving mode, wherein the connection unit AE is supplied with energy by a command aw of the other switch element SEW using the energy control system PD or the Power-over-Ethernet Switch PoE-S.

The invention claimed is:

1. A connection unit for a connection of at least one of a terminal and an access point with a network, said network providing the at least one of the connected terminal and the connected access point with electrical energy and a connection to elements of the network, the connection unit comprising:
   a connection cable, the connection cable having a first connector connecting the connection cable to a power supply of the network that provide the electrical energy, the connection cable also having a second connector connecting the connection cable to the at least one of the terminal and the access point;
   the connection cable also having a switch element embedded therein between the first connector and the second connector, the switch element of the connection cable communicatively connected to a path of transmission provided by the connection cable for the electrical energy received from the power supply of the network such that the electrical energy is transmittable to the at least one of the terminal and the access point when the switch element of the connection cable is in a first position and transmission of the electrical energy is interrupted when the switch element is in a second position such that electrical energy is not transmitted to the at least one of the terminal and the access point when the switch element is in the second position;
   a central control system to monitor and control the connection unit;
   an Ethernet control system connected to the central control system to control an Ethernet protocol,
   wherein the switch element is connected to the central control system and is controlled by the central control system to interrupt the electrical energy supply pursuant to at least one control setting;
   two connection modules which are connected with the central control system via an Ethernet-Hub for adaptation at the first connector and the second connector,
   an energy control system for adaptation of voltages of electrical energy transmitted via the first connector and the switch element to needed voltages of the connection unit; and
   an energy storage mechanism, the electrical energy being stored in the energy storage mechanism when the switch element is in the second position.

2. The connection unit of claim 1, wherein the connection cable is a patch cable, the power supply is a Power-over-Ethernet switch and the network is configured as Power-over-Ethernet.

3. The connection unit of claim 2, wherein the network is configured according to standard IEEE 802.3af.

4. The connection unit of claim 1, wherein the second connector is connected to the terminal.

5. The connection unit of claim 1, wherein the switch element has a network address assigned thereto and wherein the switch element is controlled via at least one control message sent by a management system of the network that is addressed with the assigned network address.

6. The connection unit of claim 5, wherein the switch element is adjusted to the first position or the second position in response to receipt of one of the at least one control message.

7. The connection unit of claim 1 wherein the switch element is adjusted from the first position to the second position dependent upon one of time of day, time, and presence of a user associated with the terminal.

8. The connection unit of claim 7, wherein the switch element is adjusted from the first position to the second position dependent on the time such that time dependent control of the switch element is dependent upon a daytime weekcontrol function of a management system.

9. The connection unit of claim 1 further comprising at least one member of the group consisting of an access system, a RFID System, a GPS System, and a wireless positioning system for at least one of presence dependent control and location dependent control of the switch element;
   wherein at least one of presence and location of a user is signaled to the central control system communicatively connected to the switch element to control the switch element.

10. The connection unit of claim 1, wherein upon an interruption of the electrical energy being supplied, the connection unit is controlled in a reduced energy consumption mode.

11. The connection unit of claim 1 wherein the energy storage mechanism is comprised of a capacitor.

12. A management system for at least one assigned network to control at least one connection unit for connection of terminals with a network that supplies electrical energy to the terminals, comprising:
   a connection unit, the connection unit comprising a connection cable having a first connector connecting the connection cable to a power supply of the at least one assigned network that provides the electrical energy, the connection cable also having a second connector connecting the connection cable to the terminals,
      the connection cable also having a switch element between the first connector and the second connector embedded therein, the switch element of the connection cable communicatively connected to a path of transmission provided by the connection cable for the electrical energy received from the power supply such that the electrical energy is transmittable to the terminals when the switch element is in a first position and transmission of the electrical energy is interrupted when the switch element is in a second position such that electrical energy is not transmitted to the terminals when the switch element is in the second position,
   a control system communicatively connected to the connection unit, the control system to create and transmit commands via the at least one assigned network to the connection unit to control the switch element to interrupt the electrical energy supply pursuant to at least one control setting, wherein the commands are created based on at least one member of the group consisting of time, presence of a user, and location of the user adjacent at least one of the terminals;
   the control system being in communication with a database having an address of the switch element of the connection unit such that the control system communicates with the database to address the commands sent to the switch element with the address of the switch element;
   an Ethernet control system connected to the control system to control an Ethernet protocol, two connection modules which are connected with the control system via an Ethernet-Hub for adaptation at the first connector and the second connector, an energy control system for adaptation of voltages of electrical energy transmitted via the first connector and the switch element to needed voltages of the connection unit; and an energy storage mechanism, the electrical energy being stored in the energy storage mechanism when the switch element is in the second position.

13. The management system of claim 12, further comprising at least one of a daytime control function and a week control function for time-dependent control of the switch element.

14. The management system of claim 12 comprising a network control system, said network control system communicating with at least one of a presence device and a locating device with which the presence or the location of user at or near the assigned terminals can be detected and signaled to the management system and communicating with security devices for security-related checks of the terminals and users assigned to the terminals.

15. The management system of claim 12 wherein the energy storage mechanism is comprised of a capacitor.

* * * * *